United States Patent [19]

Ando et al.

[11] 4,178,666

[45] Dec. 18, 1979

[54] METHOD OF ASSEMBLING A VALVE DEVICE FOR AN EXHAUST GAS RECIRCULATION SYSTEM OF AN INTERNAL COMBUSTION ENGINE

[75] Inventors: Masahisa Ando, Aichi; Keigo Katow, Toyota; Masami Yamazaki, Toyokawa, all of Japan

[73] Assignee: Toyota Jidosha Kogyo Kabushiki Kaisha, Toyota, Japan

[21] Appl. No.: 898,123

[22] Filed: Apr. 20, 1978

Related U.S. Application Data

[62] Division of Ser. No. 696,856, Jun. 16, 1976, Pat. No. 4,120,480.

[30] Foreign Application Priority Data

Feb. 24, 1976 [JP] Japan .................................. 51/18419

[51] Int. Cl.² ...................... B23P 15/00; F16K 27/00; F16J 3/02
[52] U.S. Cl. .......................... 29/156.7 R; 29/157.1 R; 29/454; 92/99; 92/100
[58] Field of Search .................. 29/157.1 R, 157, 407, 29/454, 156.7 R; 92/99, 100; 137/DIG. 8; 123/119 A; 251/61.2, 61.5

[56] References Cited

U.S. PATENT DOCUMENTS

| 1,145,671 | 7/1915 | Butcher | 251/61.5 |
| 2,169,683 | 8/1939 | Dunham et al. | 137/DIG. 8 |
| 2,207,840 | 7/1940 | Tornquist | 92/100 |
| 2,886,011 | 5/1959 | Radford | 92/100 |
| 3,304,880 | 2/1967 | Gold et al. | 92/100 |
| 3,648,571 | 3/1972 | Burgess | 92/100 |

Primary Examiner—Daniel C. Crane
Attorney, Agent, or Firm—Stevens, Davis, Miller & Mosher

[57] ABSTRACT

A valve device for an exhaust gas recirculation system of an internal combustion engine, which device has a diaphragm mechanism having a diaphragm to form at least one chamber which is connected to an engine port and has a valve member connected to said diaphragm via a rod to open the valve member against a force caused by a spring acting on the diaphragm, when a vacuum signal of a predetermined level is transmitted from the engine port. The device includes means for allowing adjustment of the position of the diaphragm with respect to the rod and means for securing the diaphragm to the rod after said adjustment of the position of the rod is perfected. Therefore, the EGR valve which is opened at the constant vacuum level can be obtained, with a minimum number of parts requiring high accuracy.

8 Claims, 30 Drawing Figures

METHOD OF ASSEMBLING A VALVE DEVICE FOR AN EXHAUST GAS RECIRCULATION SYSTEM OF AN INTERNAL COMBUSTION ENGINE

This is a division of application Ser. No. 696,856 filed June 16, 1976 U.S. Pat. No. 4,120,480.

SCOPE OF THE INVENTION

The present invention relates to a value device for an exhaust gas recirculation system of an internal combustion engine.

BACKGROUND OF THE INVENTION

In an exhaust gas cleaning apparatus of an exhaust gas recirculation (EGR) type, an EGR value device, which is opened for recirculating a part of the exhaust gas from the exhaust manifold to the intake manifold in accordance with a vacuum signal from an engine port, is used. The EGR value has a diaphragm mechanism having a diaphragm to form at least one chamber which is connected to an engine port, and has a valve member connected to said diaphragm via a rod to open the valve against a force caused by a spring acting on the diaphragm, when a vacuum signal of a predetermined level is transmitted from the port to the chamber.

The vacuum level at which the EGR valve is opened for EGR operation should be kept at a predetermined constant level for an ideal EGR operation, when mounting the EGR valve to the engine during the manufacturing of the automobile. The vacuum level at which the EGR valve is opened is determined by various dimensions, in the direction of the rod, of many parts forming the EGR valve. In the prior art, therefore, to obtain an EGR valve which opened at a predetermined constant vacuum level, it was necessary to construct many of these parts requiring accurate dimensions in the direction of the rod. Therefore, production of this EGR valve device was not only costly but caused much tiresome labour.

To avoid to making many parts having accurate dimensions, it has already been provided such an EGR valve having a screw mechanism for allowing adjustment of a position of the diaphragm with espect to the rod for opening at a predetermined constant vacuum level. However, this type of an EGR valve has a complicated construction due to the screw mechanism, thereby causing prolonged labour during assembling and results in the costly production of the EGR valve.

SUMMARY OF THE INVENTION

An object of the present invention is to provde an EGR valve device capable of adjusting the vacuum level at which the valve is opened, involving simple construction and a minimum number of parts requiring high accuracy.

Another object of the present invention is to provide a method for assembling such type of an EGR valve.

A further other object of the present invention is to provide an EGR valve capable of being opened of a predetermined constant vacuum level produced at a low cost.

According to one aspect of the present invention there is provided a valve device for an exhaust gas recirculation system of an internal combustion engine, which device comprises: a body having a first passageway adapted for connection with the exhaust line of the engine and a second passageway adapted for connection with the intake line of the engine; a valve member for opening or closing a valve seat formed between said first and second passageways; and a diaphragm mechanism comprising a casing secured to said body, a diaphragm arranged across the interior of said casing so as to form at least one chamber on at least one side of said diaphragm, which chamber is adapted for connection with a port formed in said intake line to transmit a vacuum signal from the intake line to said chamber, a rod one end of which is connected to said valve member and the other end of said rod is connected to said diaphragm, and a spring member urging the diaphragm in the axial direction of said rod so that the valve member can close said valve seat, said device further cmprises means for allowing the adjustment of the position of the diaphragm with respect to the rod and means for securing said diaphragm to said rod after adjustment of the position of the diaphragm with respect to the rod is perfected, in which position the valve member is displaced to open the valve seat against the force caused by the spring, when a vacuum of a predetermined level is transmitted from the engine port to the chamber.

According to another aspect of the present invention there is provided a method for assembling a valve device for an exhaust gas recirculation system of internal combustion engine, which device includes a body having passageways connected to the engine, a valve member between said passageways and a diaphragm mechanism connected to said valve member through a rod slidably supported by said body, said diaphragm mechanism includes a casing having a first half secured to the body and a second half secured to said first half, and a diaphragm arranged between said halves so as to form at least one chamber which should be connected to an engine port, said method comprising the steps of:

(a) forming a sub-assembly comprised of said diaphragm sandwiched between a set of plates by means of a sleeve member having a flange portion and a stem portion inserted to the diaphragm, and of a nut member screwed to said stem portion;

(b) inserting said sleeve member provided with said diaphragm into an end of said rod, until a peripheral portion of said diaphragm is rested on a flange portion of a second half of said casing which is secured to said body;

displacing said sleeve member with respect to said rod while clamping said peripheral portion of said diaphragm to said flange portion of said second half of said casing, in such a manner that said diaphragm is located on a predetermined position with respect to said rod;

securing said sleeve to said rod; and mounting said first half of the casing to said second half of the casing in such a manner that said peripheral portion of said diaphragm is secured between a flange portion of said first half of the casing and said flange portion of said second half of the casing. By this method, such an EGR valve device that is opened at a predetermined constant vacuum level can be easily obtained.

BRIEF DESCRIPTION OF THE DRAWINGS

FIG. 1a is an upper view of the EGR valve a first type of a diaphragm mechanism according to the invention;

FIG. 1b is a side view of the EGR valve in FIG. 1a;

FIG. 1c is another side view of the EGR valve in FIG. 1, partly shown in cross section;

FIG. 2b is an enlarged view of a part of FIG. 2a;

FIG. 8b is an enlarged view of a part of FIG. 8a;

DETAILED DESCRIPTION OF THE PREFERRED EMBODIMENTS

Figures 1A, 1B, 1C:
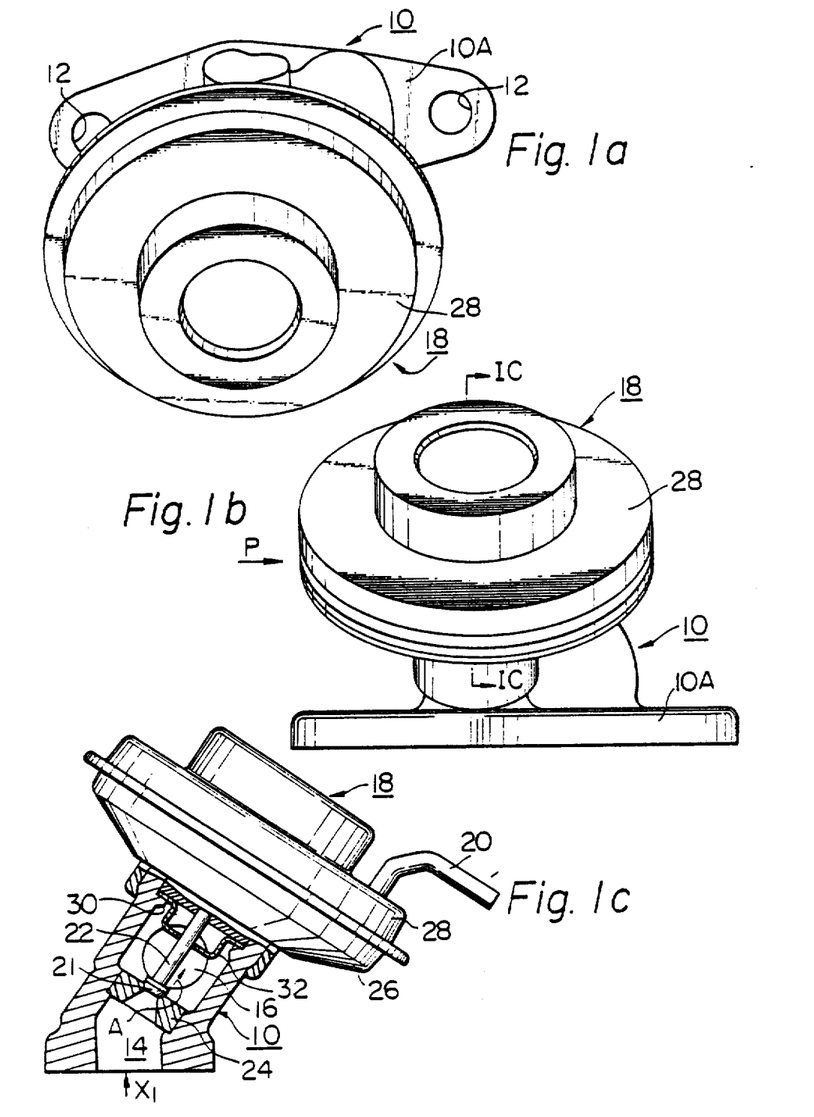

FIGS. 1a, 1b, 1c, 2a and 2b show a first embodiment of an exhaust gas recirculation valve (EGR valve) according to the invention. Referring to FIG. 1, numeral 10 designates a body which is mounted to the engine wall (not shown), or to other suitable locations of the engine body, by a leg portion 10A having holes 12 through which bolts (not shown) pass to secure the body 10 to the engine's outer wall (not shown). In FIG. 1c, the valve body 10 forms a passageway 14 adapted for communication with the engine exhaust manifold (not shown) and a passageway 16 adapted for communication with the engine intake manifold (not shown).

A diaphragm mechanism 18 is mounted on the valve body 10. The diaphragm mechanism 18 has a chamber 38 (FIG. 2a) connected to an engine port (not shown) through a pipe 20. In FIG. 1c, the diaphragm mechanism 18 has a rod 22 provided with a valve member 21 on the end of the rod 22 away from the diaphragm mechanism 18. The valve member 21 opens or closes a valve seat 24 formed between the passageways 14 and 16, in response to a vacuum signal transmitted to the diaphragm mechanism from the engine port (not shown) via the pipe 20.

Figure 2A:
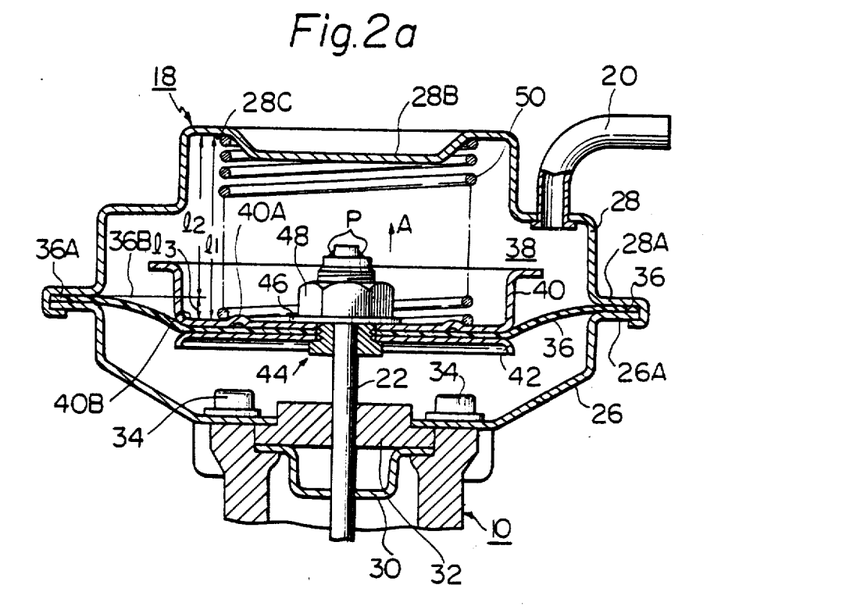
FIG. 2a is an enlarged sectional view of the diaphragm mechanism of the EGR valve in FIGS. 1a, 1b and 1c.

As shown in FIG. 2a, the diaphragm mechanism 18, has a lower casing 26 (FIG. 1c) secured to the valve body 10 by bolts 34, via a guide member 30 which slidably supports the rod 22 and via the dust plate 32 which prevents dust from entering into the exhaust gas and clogging a gap between the rod 22 and the guide member 30. An upper casing 28 is secured to the lower casing 26, as is described hereinafter.

Figure 2B:
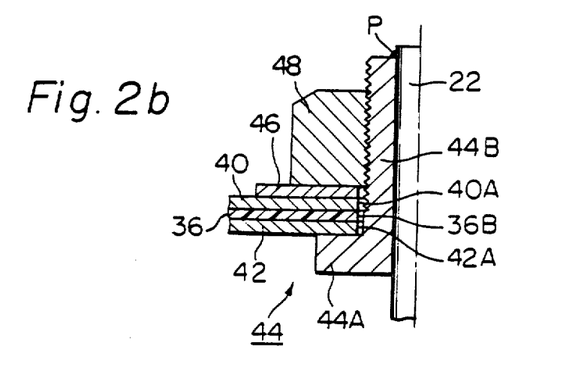

As shown in FIG. 2a, a diaphragm 36 made of rubber material is arranged across the interior of the diaphragm mechanism 18 between the lower and upper casing 26 and 28 so as to form a chamber 38 on the side of the diaphragm 36 remote from the body 10. One end of the pipe 20 is secured to the casing 28 so that the pipe 20 communicates with the chamber 38. The diaphragm 36 is, at a peripheral portion 36A thereof, secured to the casing 26 and 28 between flange portions 26A and 28A thereof. In FIG. 2b, the diaphragm 36 is sandwiched by a lower plate 42 and upper plate 40 by means of a sleeve member 44 having a flange portion 44A and a stem portion 44B which is inserted to an opening 36B in the diaphragm 36 and openings 40A and 42A in the respective plates 40 and 42, and of a nut 48 screwed to the stem portion 44B. In this case, the diameter of the flange portion 44A is so determined that the flange portion 44A engages with the opening 42A of the lower plate 42 when the stem 44B is inserted into the opening 42A. Therefore, the diaphragm 36 is held between the plates 40 and 42 by the sleeve 44 and the nut 48 screwed the sleeve 44 via a washer 46. The sleeve 44 which is axially slidably inserted to the upper end of the rod 22 is secured to the rod 22 by arc welding after adjustment of a predetermined position of the sleeve 44 to the rod 22.

In FIG. 2a, a coil spring 50 (FIG. 2a) is arranged in the chamber 38 for urging the diaphragm 36 so as to allow the valve member 21 to be displaced and to close the valve seat 24 as shown in FIG. 1c. A recess 28B formed in the inner wall of the upper casing 28 and annular projections 40A formed on the upper plate 40 are seats for the spring 50.

In the use of the above-mentioned EGR valve, a vacuum signal from the engine port (not shown) is transmitted to the chamber 38 via the pipe 20. The diaphragm 36 is displaced in the direction of the rod 22 as shown by an arrow A against a force caused by the spring 50 when a vacuum signal of a level for overcoming said force is transmitted to the chamber 38. The valve member 21 (FIG. 1c) connected to the diaphragm 36 via the rod 22 is simultaneously displaced as shown by the arrow A (FIG. 1c), in order to allow the valve member 21 to be displaced (or opened) from the seat 24. This causes a part of the exhaust gas to be recirculated from the passageway 14, as shown by an arrow $X_1$, to the passageway 16, whereby an amount of $NO_x$ component in the engine exhaust is decreased.

As shown in FIG. 2a, to carry out an effective EGR operation it is necessary to use such an EGR valve whereby said valve is adjusted so as to be opened at a predetermined constant vacuum level against the force generated by the spring 50. To this end, it is necessary to keep a constant length $l_1$ (FIG. 2a) between an inner surface 28c of the upper casing 28 on which the upper end of the spring 50 is rested and an upper surface 40B of the plate 40 on which the lower end of the spring 50 is rested, and to keep a constant force generated by the spring 50 when said spring is compressed to the length of $l_1$.

However, the adjustment of the length $l_1$ is very difficult because said length is determined by various dimensions, in the direction of the rod 22, of the various parts 10, 21 (FIG. 1c), 22, 24 (FIG. 1c), 26, 28, 40 and 42, etc, and affected by errors in these dimensions which are inevitable during manufacturing of the various parts. According to the present invention as will be described hereinafter, this difficulty is overcome. To this end, according to the invention the length $l_3$ (FIG. 2a) between an upper surface 36B which is formed by the peripheral portion 36A of the diaphragm 36 and the upper surface 40B of the plate 40 can be adjusted so that a constant length $l_3$ is always provided. Therefore, if the upper casing 28 is made so that it has a constant length $l_2$ between the inner surface 28c and the surface 36B, the predetermined constant length $l_1$ which is the sum of $l_2$ and $l_3$ is always obtained.

Figure 3A:
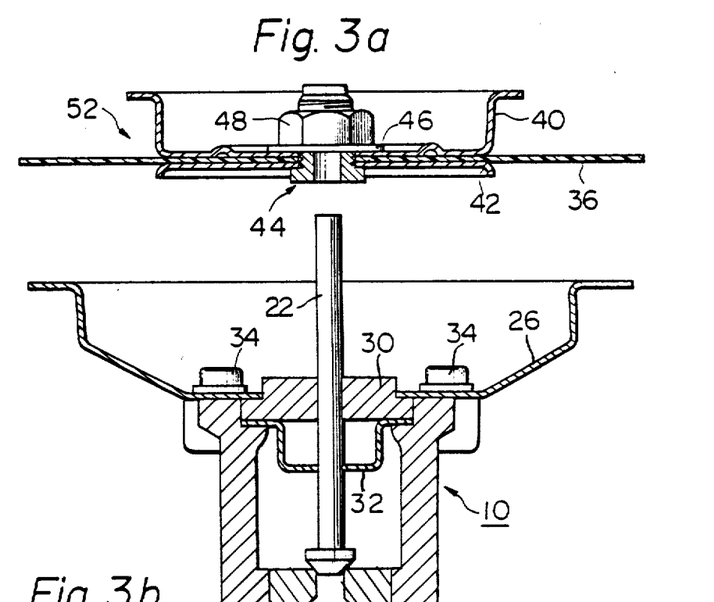
FIGS. 3a through 3d are sectional views of the diaphragm mechanism in FIG. 2a, each showing a step in the assembling of the mechanism.
Figure 3B:
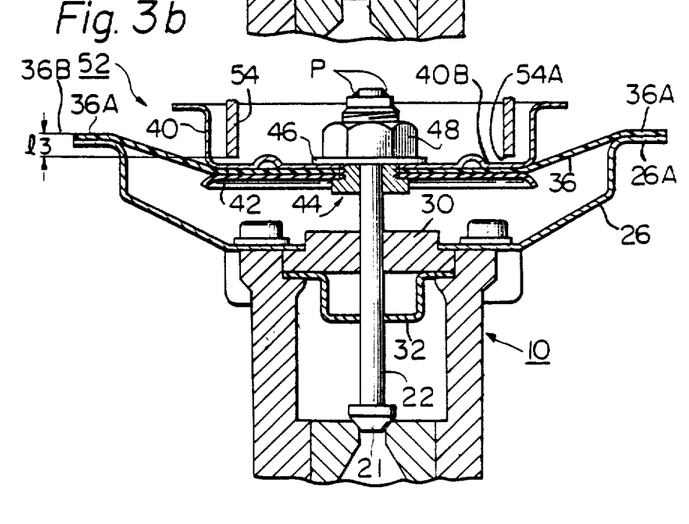

The EGR valve is assembled by securing the lower casing 26, as shown in FIG. 3a, to the body 10 by the bolts 34, while the guide 30 and the dust plate 32 are arranged between the casing 26 and the body 10 and while the rod 22 is inserted to the guide 30 and the dust plate 32. At the same time, the sub-assembly 52, comprised of the diaphragm 36 sandwiched between the plates 40 and 42, the sleeve 44 which is inserted into the diaphragm 36 and the plates 40 and 42, and nut 48 screwed to the sleeve 44 through the washer 46, is formed. Further, the sleeve 44 of the sub-assembly 52 is inserted to the upper end of the rod 22, until the peripheral portion 36A of the diaphragm 36 is rested on the flange portion 26A of the lower casing 26, as shown in FIG. 3b. After this, the diaphragm peripheral portion 36A is temporally clamped to the casing flange portion 26A by a clamp device (not shown).

Figure 3C:
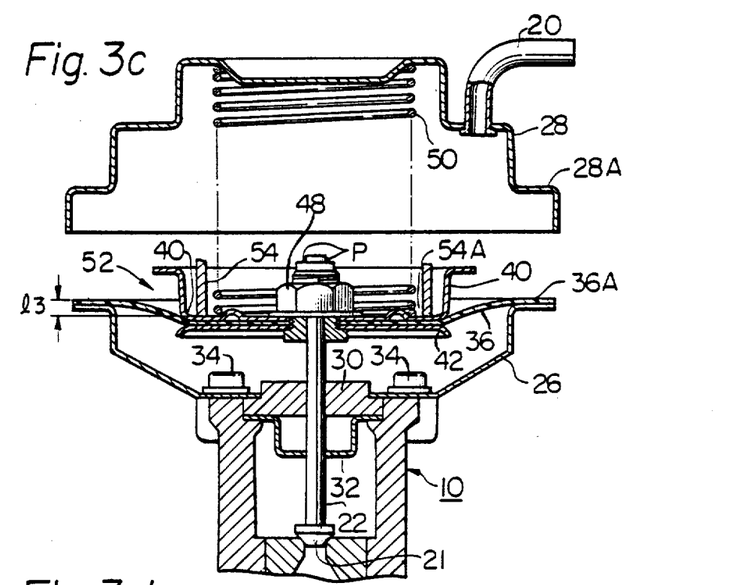

Next, a positioning member 54, for locating the diaphragm 36 on a predetermined position with respect to the rod 22, is arranged on a predetermined location above the upper plate 40 of the sub-assembly 52. In this case the distance between a lower surface 54A of the positioning member 54 and the surface 36B of the peripheral portion 36A of the diaphragm 36 is so determined that it corresponds to said length $l_3$. Following this, the sleeve 44 of the sub-assembly 52 is displaced on the rod 22 until the upper surface 40B of the upper plate 40 is engaged with the lower surface 54A of the positioning member 54 as shown in FIG. 3c. This operation may be, advantageously, carried out by using a magnet, to which the plate 40 is attracted.

The sleeve 44, then, is secured to the rod 22 by an arc welder at points P in FIG. 3c, while engaging the upper plate 40 with the positioning member 54. As a result of this, the sleeve 44 is secured on the predetermined position of the rod 22 so that the predetermined constant length $l_3$ is maintained between the surfaces 36B (FIG. 3b) and 40B.

Figure 3D:
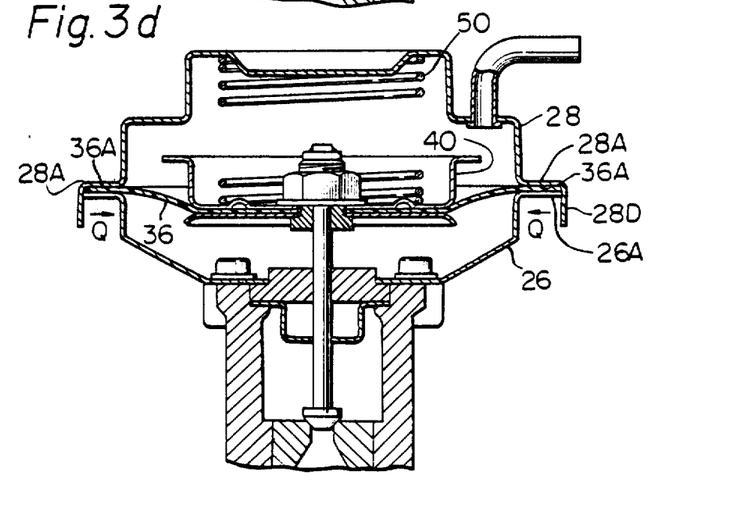

In FIG. 3d, after the completion of the welding of the sleeve 44 to the rod 22, said clamp and the positioning member 54 are removed. Then the spring 50 is arranged on the seat 40A (FIG. 3c) and the flange portion 28A of the upper casing 28 provided with the pipe 20 (FIG. 3c) is rested on the peripheral portion 36A of the diaphragm 36 against the force caused by the spring 50 as shown in FIG. 3d. After this, the edge portion 28D of the flange portion 28A is folded toward the inward direction shown by an arrow Q, to secure the peripheral portion 36A of the diaphragm 36 between the flange portions 28A and 26A. Thus, the EGR valve as shown in FIG. 2a is assembled.

According to the method of the present invention, the predetermined constant distance $l_3$ is always provided despite the inevitable errors of the dimensions, in the direction of the rod 22, of the various parts 10, 21, 22, 24, 40, 42, 44, etc, because the sub-assembly 52 is axially slidable on the rod 22 and is secured to the rod 22 after the length $l_3$ is adjusted. Therefore, if the upper casing 28 is made so that it has a constant length $l_2$, then, the constant length $l_1 (=l_2+l_3)$ can always be obtained. Thus, if the spring 50 is made so that a constant force is generated when it is compressed the length of $l_1$, the EGR valve can then be opened at a predetermined constant vacuum level, to carry out a desirable EGR operation. In other words, according to the present invention, it is necessary to produce only two parts 28 and 50 with high accuracy to obtain an EGR valve opened at a predetermined constant vacuum level. This is very advantageous, because, in the known EGR valve, many parts with high accuracy are necessary. As a result of the advantage of the present invention, the cost of the EGR valve has decreased to a great extent.

Figures 4A, 4B:
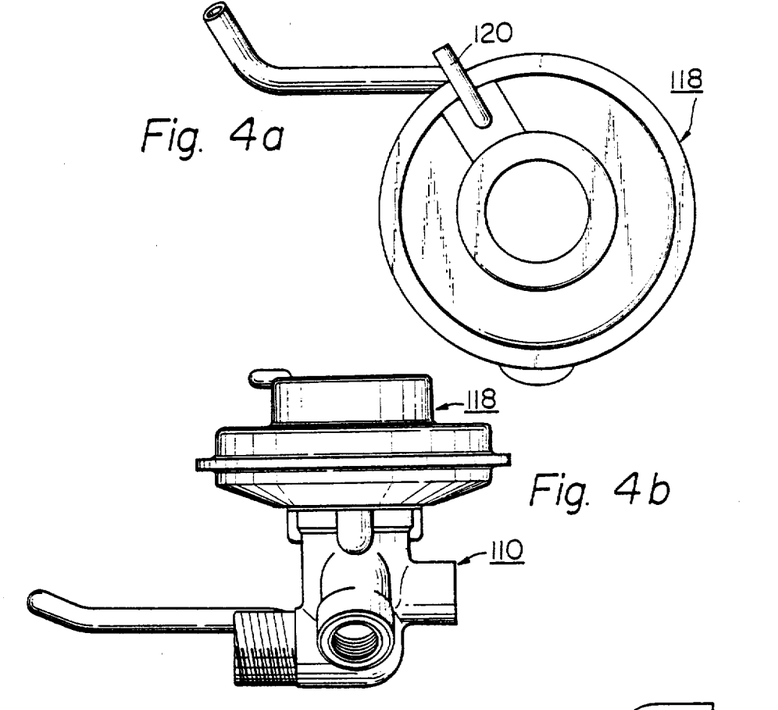
FIGS. 4a, 4b and 4c are an upper view, a side view and another side view, respectively, of a second modification of the EGR in FIGS. 1a, 1b and 1c.
Figure 4C:
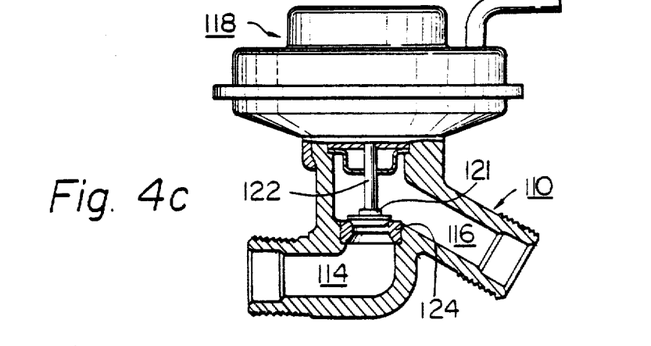

In a modification of the present invention shown in FIGS. 4a, 4b and 4c, a body 110 (FIGS. 4b, 4c) is slightly reformed in comparison with the body 10 (FIGS. 1a through 3d). The body 110, which should be mounted to the engine wall (not shown), has a passageway 114 connected to the intake manifold and another passageway 116 connected to the exhaust manifold, as shown in FIG. 4c. A valve member 121, adapted for opening or closing a valve seat 124 between the passageways 114 and 116, is connected via a rod 122, to a diaphragm mechanism 118 which has a similar construction as that of the diaphragm mechanism 18 in FIG. 2a, and a similar assembling process as that described in FIGS. 3a through 3d.

Figure 5A:
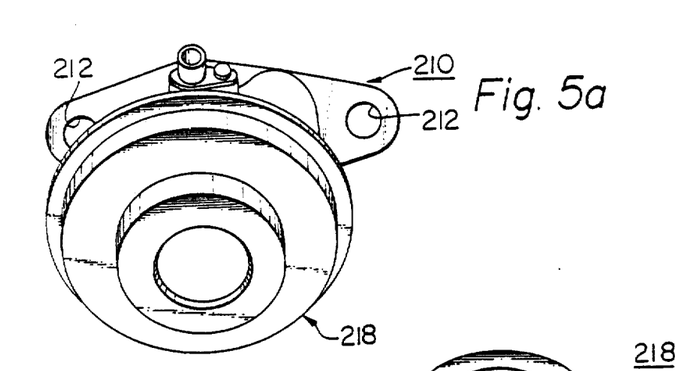
FIGS. 5a, 5b and 5c are an upper view, a side view and another side view, respectively, of another modification of the EGR valve in FIGS. 1a, 1b and 1c.
Figure 5B:
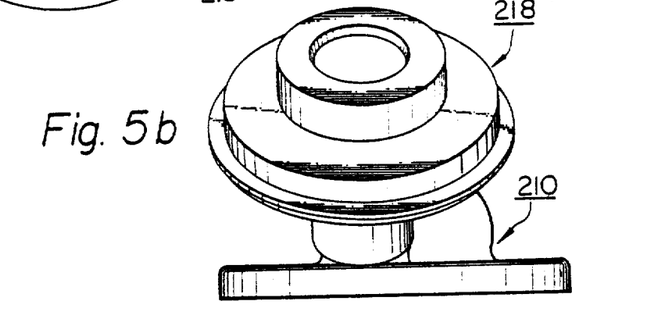
Figure 5C:
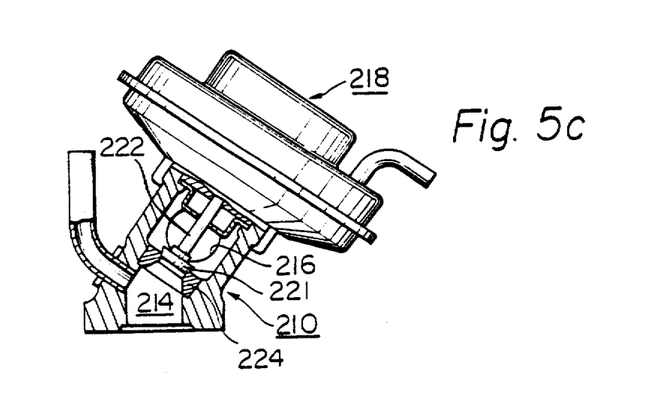

In another modification shown in FIGS. 5a, 5b and 5c, a diaphragm mechanism 128 of substantially the same construction as that of the diaphragm mechanism 18 in FIG. 2a is used. However, a body 210, which should be mounted to the engine wall, is slightly reformed. As seen in FIG. 5c, the body 210 has a passageway 214 connected to the intake manifold (not shown) and another passageway 216 connected to the exhaust manifold (not shown). A valve member 221, adapted for opening and closing a valve seat 224 between the passageways 214 and 216, is connected, via a rod 222, to the diaphragm mechanism 218.

Figures 6A, 6B, 6C:
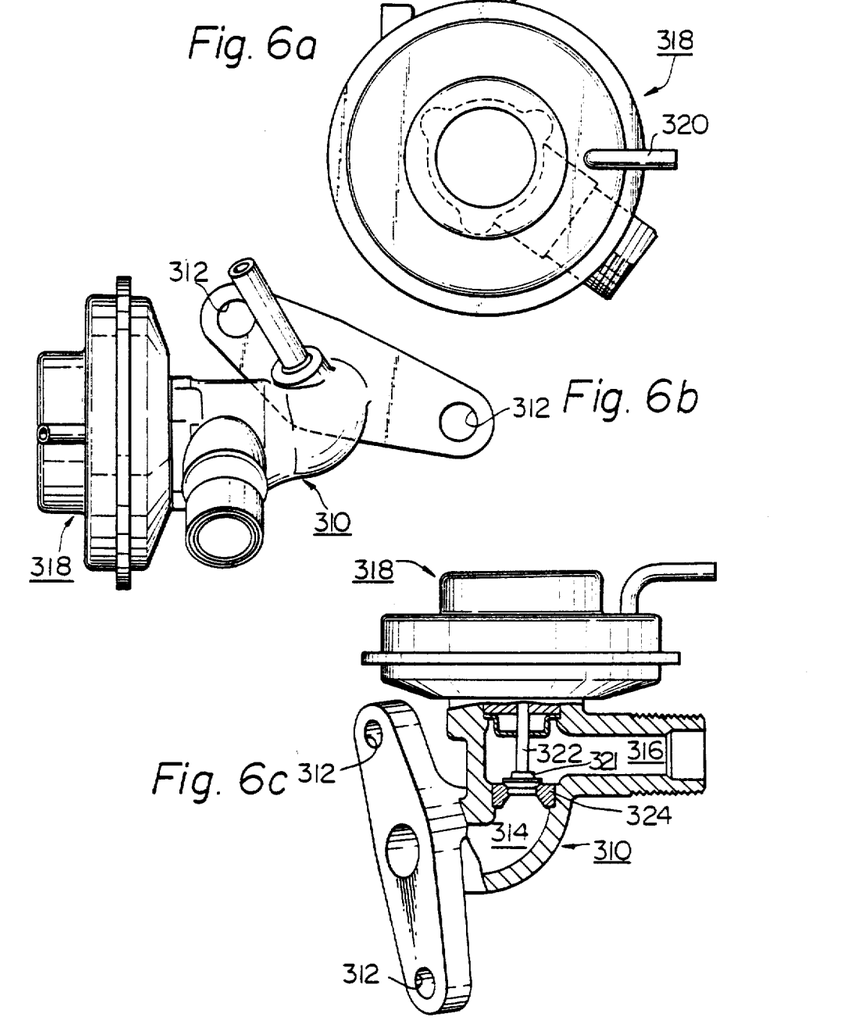
FIGS. 6a, 6b and 6c are an upper view, a side view and another side view, respectively, of another further modification of the EGR valve in FIGS. 1a, 1b and 1c.
Figures 7A, 7B, 7C:
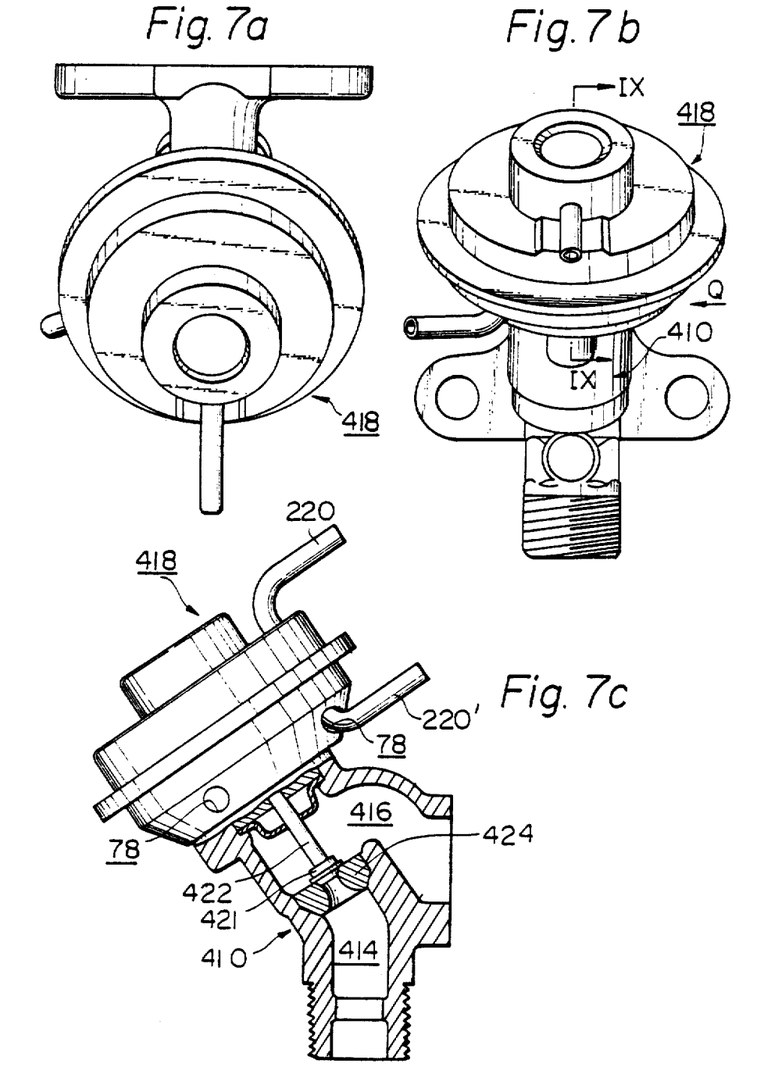
FIGS. 7a, 7b and 7c are an upper view, a side view and another side view, respectively, of an EGR valve device, exhibiting a second type of diaphragm mechanism according to the invention.

In another further modification in FIGS. 6a, 6b and 6c, a diaphragm mechanism 318 of substantially the same construction as that of the diaphragm mechanism 18 in FIG. 2a is used. However, a body 310, which should be mounted to the engine wall, is slightly reformed. As seen in FIG. 6c, the body 310 has a passageway 314 connected to the intake line and a passageway 316 connected to the exhaust manifold. A valve member 321, adapted for opening and closing a valve seat 324 between the passageways 314 and 316, is connected, through a rod 322, to the diaphragm mechanism 318.

The diaphragm mechanisms 18 (FIG. 1a), 118 (FIG. 4a), 218 (FIG. 5a) and 318 (FIG. 6a) have substantially the same construction as that illustrated above. However, a diaphragm mechanism 418 for a EGR valve in FIGS. 7a, 7b, 7c and 8 according to the second embodiment of the invention differs from the diaphragm mechanism 18 (FIG. 1a), 118 (FIG. 4a), 218 (FIG. 5a) and 318 (FIG. 6a) in that this diaphragm mechanism 418 has two pipes 220 and 73 which is connected to chambers 438 and 74 (FIG. 8a), respectively. The chamber 74 and 438 are connected to a first and second engine ports (not shown), respectively. The diaphragm mechanism 418 is mounted on a body 410 to operate the valve member 421 through a rod 422 for opening or closing a valve seat 424 between a passageway 414 connected to the exhaust manifold (not shown) and a passageway 416 connected to the intake manifold (not shown).

Figure 8A:
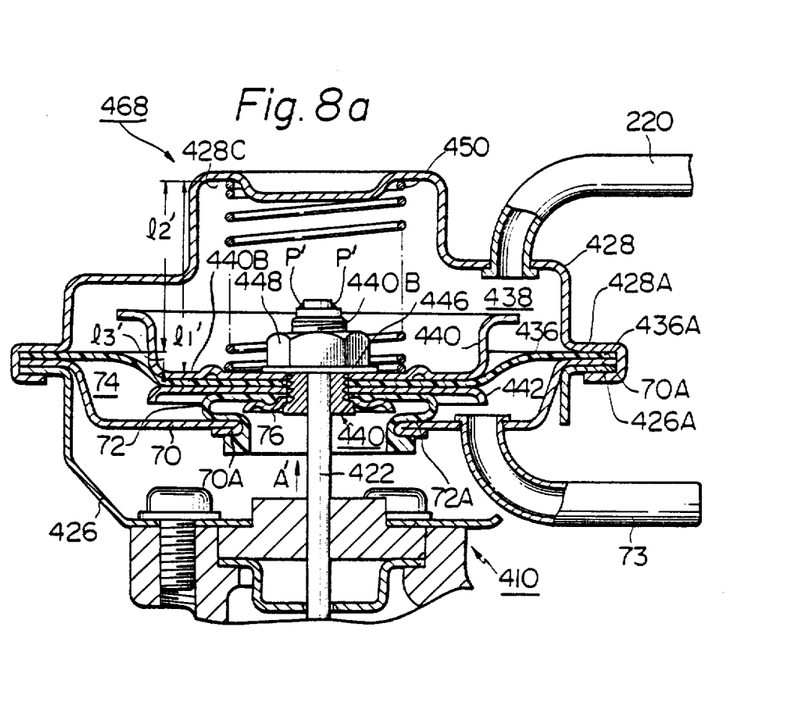
FIG. 8a is an enlarged sectional view of the diaphragm mechanism of the EGR valve in FIGS. 7a, 7b and 7c.
Figure 8B:
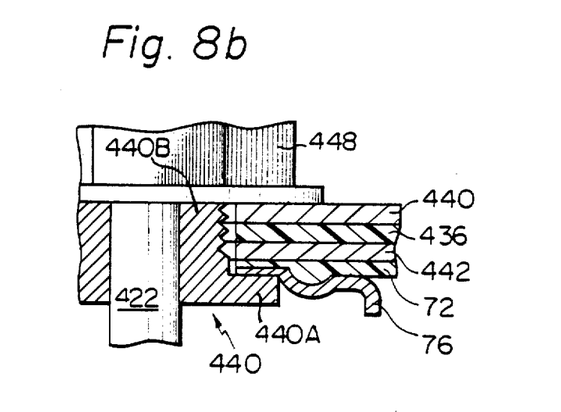

As shown in FIG. 8a, a bellows member 72 of a rubber material and of a sleeve shape is arranged on the side of a diaphragm 436 facing the body 410. The lower side of the bellows member 72 is held by a plate member 70 arranged across the interior of the diaphragm mechanism 418 between an upper casing 428 and a lower casing 426, by fitting an annular groove 72A formed on the outer surface of the bellows 72 into an inner circular edge portion 70A formed on the plate 76, so that the second chamber 74 which is connected to the second engine port (not shown) through the pipe 73 is formed on the opposite side of the chamber 438. The upper side of the bellows member 72 is secured to the diaphragm 436, by means of a sleeve 444 having a flange portion 444A and stem portion 444B as shown in FIG. 8b, a ring member 76 which is inserted into the stem portion 440B and a nut 448 which is screwed into the stem portion 444B through a washer 446, so that the sleeve 444 provided with the diaphragm 436 and the bellows 72 is axially slidably mounted on the upper end of the rod 422, which sleeve 444 is secured to the rod 442 after the adjustment of the sleeve 440 on a predetermined position of the rod 442 is perfected.

The diaphragm 436 and the plate 70, at peripheral portions 436A and 70A thereof, are secured to the lower casing 426 and upper casing 428 between flange portions 426A and 428A thereof.

In the use of this type of an EGR valve, vacuum signals from the first and second engine ports (not shown) are transmitted to the chambers 438 and 74, respectively via the pipe 220 and 70, respectively. The diaphragm 436 and the upper side of the bellows 72 are displaced as shown by an arrow A' when the pressure difference between the chamber 438 and 74 overcome a force caused by a spring 450, allowing the valve member 421 (FIG. 7c) to be opened for the EGR operation.

To carry out this EGR operation in a desirable manner, it is necessary to keep a constant length $l_1$, between an inner surface 428C (FIG. 8a) of the upper casing 428 on which the upper end of the spring 450 is rested and an upper surface 440B (FIG. 8a) of the plate 440 on which a lower surface of the spring 450 is rested. This adjustment of the length $l_1$, is carried out by a similar method is already illustrated with respect to the first type of EGR valve in FIGS. 3a through 3d.

Figure 9A:
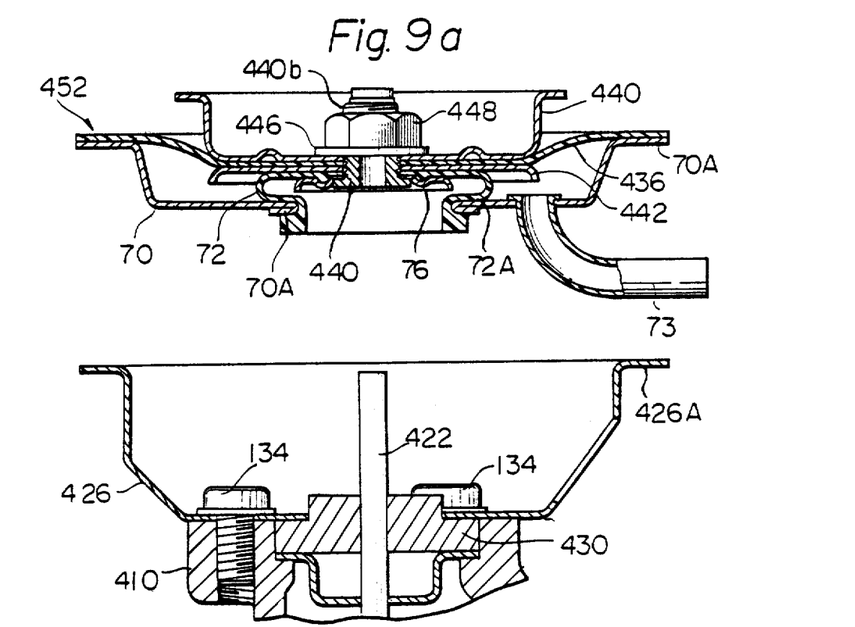
FIGS. 9a through 9d are sectional views of the diaphragm mechanism in FIG. 8a, each showing a step in the assembling of the mechanism.
Figure 9B:
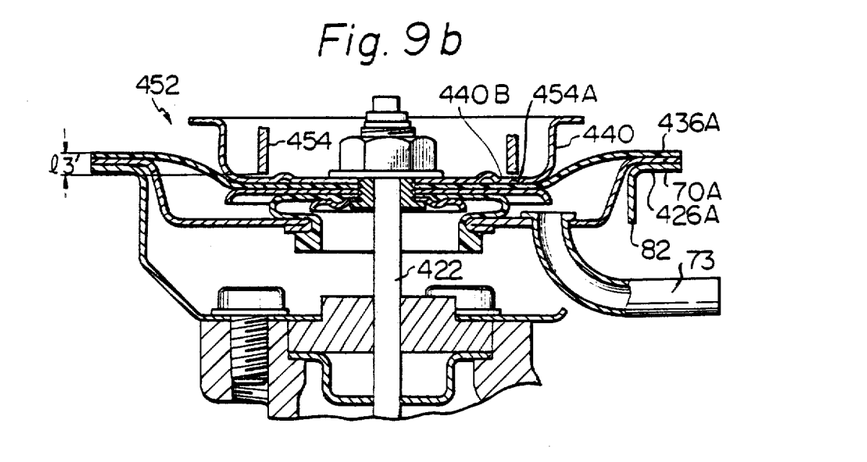

The second type of EGR valve is initially assembled by forming a sub-assembly 452 (FIG. 9a) comprised of the diaphragm 436 arranged between the plates 440 and 442, the bellows member 72, the sleeve member 444 which is inserted into the upper side of the bellows 72 and the diaphragm 436 sandwiched between the plates 442 and 436, via the ring 76; the nut 448 screwed to the stem portion 444B of the sleeve 444, via the washer 446; and the plate member 70 having the inner circular edge portion 70A which is tightly fitted to the annular groove 72A formed on the lower side of the bellows 70 and having the pipe 73 an upper end of which is secured to the plate member 70. Then, the sleeve 444 of the sub-assembly 80 is inserted to the upper end of the rod 422 which is already slidably mounted to a guide 430 which is secured between the lower casing 426 and the body 410 by the bolts 134, until a flange portion 70A of the plate member 70 is rested on the flange portion 426A of the lower casing 426, as shown in FIG. 9b. In this case, the pipe 70 (FIG. 9a) is passed through one of the holes 82 in the casing 426 (FIG. 9a). After this, the diaphragm peripheral portion 436A and the flange portion 70A are temporally clamped to the flange portion 426A.

Next, the clamped sub-assembly 452 is displaced upwardly on the rod 422 until an upper surface 440B of the plate 440 is engaged to a lower surface 454A of a positioning member 454 which is arranged above the plate 440 in such a manner that a predetermined distance $l_3'$ is formed between the peripheral portion 463A of the diaphragm and the lower surface 454A of the positioning member 454, as shown in FIG. 9a.

Figure 9C:
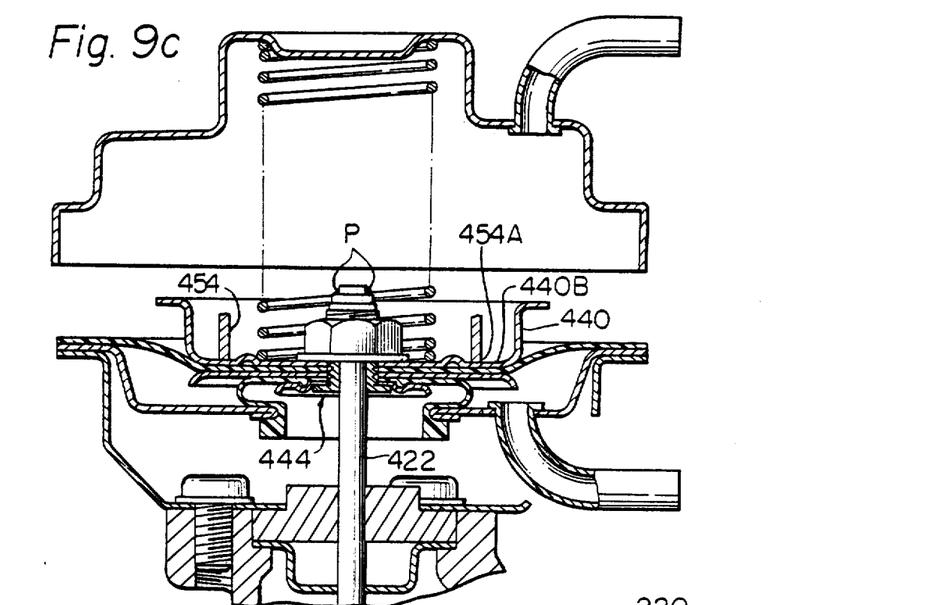

The sleeve 444, then, is secured to the rod 422 by an arc welder at point P, as shown in FIG. 9c, while engaged between the positioning member 454 and the plate 440.

Figure 9D:
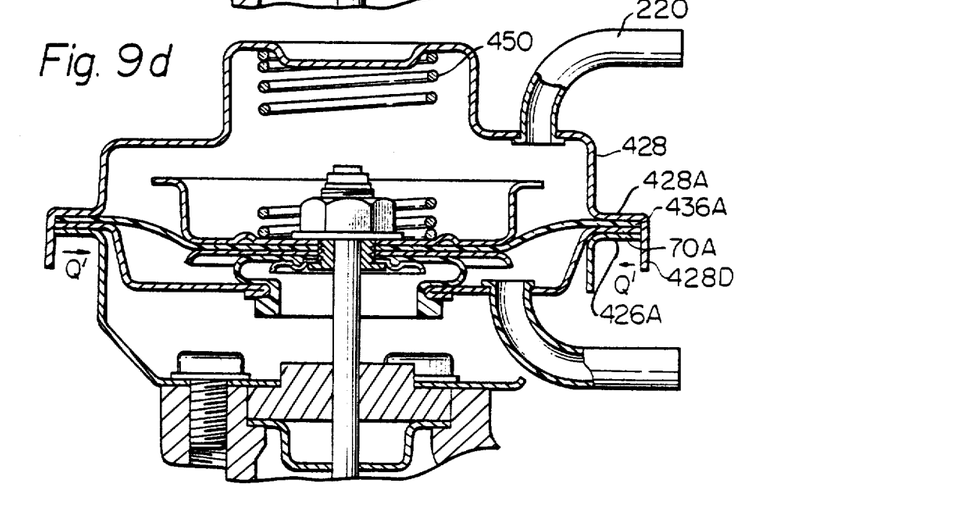

After the completion of the welding of the sleeve 444 (FIG. 9c) to the rod 422, the clamp (not shown) and the positioning member 454 (FIG. 9c) are removed, and, then, the flange portion 428A of the upper casing 428 having the pipe 220 is rested on the peripheral portion 436A of the diaphragm, via the spring 450 as shown in FIG. 9d. After this, a circumferential edge portion 428D is folded toward the inner direction as shown by arrows Q', to secure the portion 436A and 70a between the portions 426A and 428A. Thus, the second type of the EGR valve as shown in FIG. 8a is assembled.

In this method for assembling the EGR valve illustrated by FIGS. 9a through 9d the predetermined constant length $l_3'$ is always provided because the sub-assembly 452 which is secured to the rod 422 after the adjustment of the length $l_3$ is performed by the positioning member 454 is axially slidable on said rod 422. Therefore, to obtain the constant length $l_1'$ ($=l_2'$ and $l_3'$) for operating the EGR valve at a constant vacuum level, it is necessary to produce only two parts with high accuracy, for example, an upper casing 428 which has the predetermined constant length of $l_2'$, and a spring 450 which generates a constant force when compressed to a length $l_1'$.

Figures 10A, 10B, 10C:
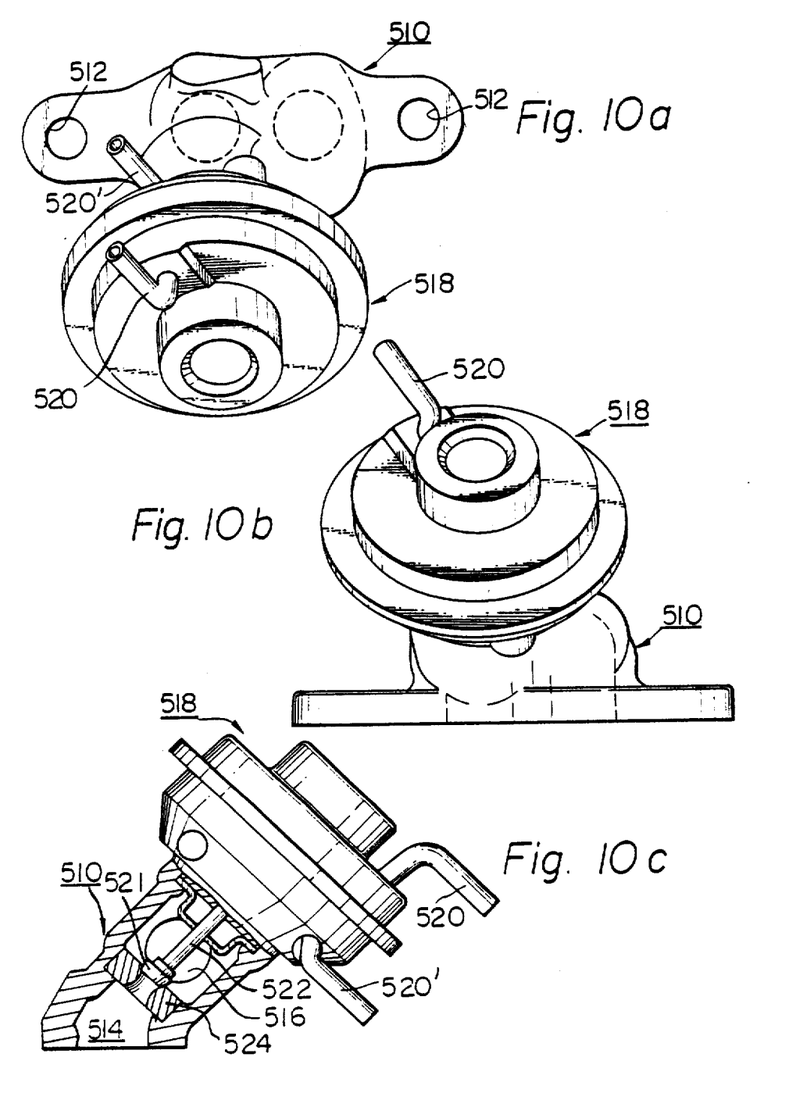
FIGS. 10a, 10b and 10c are, an upper view, a side view and another side view, respectively, of second modification of an EGR valve device as shown in FIGS. 7a, 7b and 7c.

In another modivication of an EGR valve device shown in FIGS. 10a, 10b and 10c, a body 510 which is slightly modified is used. The body 510, which should be mounted to the engine wall, has a passageway 514 connected to the intake manifold (not shown) and another passageway 516 connected to the exhaust manifold (not shown). A valve member 521, adapted for opening or closing a valve seat 524 beteen the passageways 514 and 516, is connected via a rod 522, to a diaphragm mechanism 518 which has a construction similar to that of the diaphragm mechanism in FIG. 8a. This valve is assembled in a process similar to that described in FIGS. 8a through 8d.

While the invention has been described by referring to specific embodiments for purposes of illustrations, it should be apparent that many changes could be made within the scope of the invention.

We claim:

1. A method for assembling a valve device for an exhaust gas recirculation system of an internal combustion engine, which device includes a body having passageways connected to an engine, a valve member between said passageways and a diaphragm mechanism connected to said valve member through a rod slidably supported by said body, said diaphragm mechanism includes a casing having a first half secured to said body and a second half secured to said first half, and a diaphragm arranged between said halves so as to form at least one chamber which should be connected to an engine port, said method comprising the steps of:

(a) forming a sub-assembly comprised of said diaphragm sandwiched between a set of plates by means of a sleeve member having a flange portion and a stem portion extending through the diaphragm and the plates, and of a nut member screwed to said stem portion with the diaphragm and the plates held securely between the nut member and the flange portion;

(b) inserting said sleeve member of said formed sub-assembly onto said end of said rod, until a peripheral portion of said diaphragm is rested on a flange portion of said first half of said casing which is secured to said body;

(c) displacing said sleeve member of said formed sub-assembly along said rod while clamping said peripheral portion of said diaphragm to said flange portion of said first half of said casing, in such a manner that the set of plates and the portion of the diaphragm sandwiched therebetween are located in a predetermined position with respect to the first half by means of a positioning member so that said sleeve member is located in a desired position on said rod;

(d) fixedly securing said sleeve member to said rod at the desired position; and (e) mounting said second half of said casing to said first half of said casing in such a manner that said peripheral portion of said diaphragm is secured between said flange portion of said first half of said casing and a flange portion of said second half of said casing, whereby such a valve device, capable of being opened at a predetermined constant vacuum level, is obtained.

2. A method according to claim 1, wherein said sleeve member in (d) is secured to said rod by arc welding.

3. A method for assembling a valve device for an exhaust gas recirculation system of an internal combustion engine, which device includes a body having passageways connected to an engine, a valve member between said passageways and a diaphragm mechanism connected to said valve member through a rod slidably supported by said body, said diaphragm mechanism includes a casing having a first half secured to said body and a second half secured to said first half, a diaphragm arranged between said halves so as to form, on the side of said diaphragm remote from said body, a first chamber connected to an engine port, and a bellows member arranged on the side of the diaphragm facing said body so as to form, on the opposite side of said first chamber with respect to said diaphragm, a second chamber connected to another engine port, said method comprising the steps of:

(a) forming a sub-assembly comprised of said diaphragm sandwiched between a set of plates, said bellows member of a sleeve shape, a sleeve member having a flange portion and a stem portion, wherein said stem portion is inserted into the side of said bellows member remote from said body through a ring member and through said diaphragm and said set of plates, a nut screwed to said stem portion so that said diaphragm together with said side bellows member is secured to the sleeve member with the ring member, the bellows, the diaphragm, and the set of plates held securely between the nut member and the flange portion, and a plate member for holding the side of said bellows member nearest to the body, the peripheral portion of said plate member being in contact with the peripheral portion of said diaphragm, (b) inserting said sleeve member of said formed sub-assembly onto an end of said rod remote from said valve member, until said peripheral portion of said plate member is rested on a flange portion of said first half of the casing;

(c) displacing said sleeve member of said formed sub-assembly along said rod while clamping said peripheral portion of said plate member to the flange portion of the first half of said casing, in such a manner that the set of plates and the portion of the diaphragm sandwiched therebetween are located in a predetermined position with respect to the first half by means of a positioning member so that said sleeve member is located in a desired position on said rod;

(d) fixedly securing said sleeve member to said rod;

(e) mounting said second half of said casing to said first half, in such a manner that the peripheral portions of said diaphragm and said plate member are secured between the flange portion of the first half of said casing and a flange portion of the second half of said casing.

4. A method according to claim 3, wherein said sleeve member in (d) is secured to said rod by arc welding.

5. A method for assembling a valve device for an exhaust gas recirculation system of an internal combustion engine, which device includes a body having passageways connected to an engine, a valve member between said passageways, a rod slidably supported by said body, one end of the rod being connected to the valve member, and a casing having a first half secured to said body and a second half secured to said first half, said method comprising the steps of:

(a) forming a sub-assembly comprised of a diaphragm sandwiched between a set of plates by means of a sleeve member having a flange portion and a stem portion extending through the diaphragm and the plates, and of a nut member screwed to said stem portion with the diaphragm and the plates held securely between the nut member and the flange portion;

(b) inserting said sleeve member of said formed sub-assembly onto the end of said rod remote from the valve member, until a peripheral portion of said diaphragm is rested on a flange portion of said first half of said casing which is secured to said body;

(c) displacing said sleeve member of said formed sub-assembly along said rod while clamping said peripheral portion of said diaphragm to said flange portion of said first half of said casing, in such a manner that the set of plates and the portion of the diaphragm sandwiched therebetween are located in a predetermined position with respect to the first half by means of a positioning member so that said sleeve member is located in a desired position on said rod;

(d) fixedly securing said sleeve member to said rod at the desired position; and (e) mounting said second half of said casing to said first half of said casing in such a manner that said peripheral portion of said diaphragm is secured between said flange portion of said first half of said casing and a flange portion of said second half of said casing, whereby such a valve device, capable of being opened at a predetermined constant vacuum level, is obtained.

6. A method according to claim 5, wherein said sleeve member in (d) is secured to said rod by arc welding.

7. A method according to claim 5, wherein said subassembly in step (a) further comprises:
   a ring member;
   a bellows member of sleeve shape, one end of which is arranged between the ring member and one of the sets of plates facing the body;
   the stem portion being inserted to the ring member, the flange portion abutting against the ring member, and;
   an annular shaped plate member, the other end of the bellows member being fitted to the annular plate, a peripheral portion of the plate member in step (b) is, together with the peripheral portion of the diaphragm, rested on a flange portion of the first half of the casing, the peripheral portion of the plate member in step (c) is, together with the peripheral portion of the diaphragm, clamped to the flange portion of the first half of the casing.

8. A method according to claim 7, wherein said sleeve member in (d) is secured to said rod by arc welding.

* * * * *